United States Patent

Meyer

[15] 3,695,716
[45] Oct. 3, 1972

[54] TRACTOR ATTACHMENT WITH VARIABLE SPEED DRIVE UNIT

[72] Inventor: Phillip A. Meyer, R.R. #1, Box 171, Palatine, Ill. 60067

[22] Filed: Oct. 28, 1970

[21] Appl. No.: 84,826

[52] U.S. Cl. ............... 299/25, 37/43 E, 37/DIG. 17, 37/86, 172/21, 172/122, 172/125, 172/438, 173/24, 173/46, 180/74
[51] Int. Cl. ..................... E01b 5/12, A01b 49/00
[58] Field of Search ....180/74, 44; 172/125, 74, 105, 172/114, 292, 438; 37/DIG. 17, 43 B, 43 E; 299/25; 173/24, 46

[56] References Cited

UNITED STATES PATENTS

| | | | |
|---|---|---|---|
| 2,169,224 | 8/1939 | cole | 37/43 E |
| 2,252,837 | 8/1941 | Dicke | 37/DIG. 17 |
| 2,373,318 | 4/1945 | Lewin | 37/43 E |
| R23,771 | 1/1954 | Vanrick | 37/43 E |
| 2,981,012 | 4/1961 | Meyer | 37/DIG. 17 |
| 3,123,173 | 3/1964 | Jacobs | 180/74 |
| 3,343,621 | 9/1967 | Van Doorne | 180/74 |

FOREIGN PATENTS OR APPLICATIONS

| | | | |
|---|---|---|---|
| 834,486 | 3/1952 | Germany | 180/74 |

*Primary Examiner*—Robert E. Pulfrey
*Assistant Examiner*—Clifford D. Crowder
*Attorney*—Milford A. Juten

[57] ABSTRACT

An attachment for operation by a conventional tractor having the three arm support or similar attachment means and a power take-off which support and drive a material removal machine which is power-driven by the power take-off. The material removal machine includes a screw which moves the material from the sides towards the center into a centrifugal blower which disposes of the material. The attachment also includes driving wheels which engage the driving wheels of the tractor and which is driven by an infinite control speed changer to drive the tractor wheels in either a forward or reverse direction at extremely slow speeds, whereby the material removal machine can be moved toward the material such as a snow bank at the very slow speed to provide maximum efficiency of the equipment. An ice breaker is mounted on a horizontally extending shaft and has teeth which are swingable to break the ice. A ditch excavating attachment is adapted for mounting on the material removal machine and driven thereby taking advantage of the slow movement of the tractor by the infinite speed adjustment. This arrangement provides for slow speed movement of the tractor with maximum speed of the material collecting, processing and blowing means and also of the ditch digging attachment. The attachment also provides an auxilliary power take-off for spraying equipment and the like. Also by simple exchanging of other shafts for the collector screw and/or ice breaking shaft, a myriad of other functions can be efficiently performed, such as lawn raking, sweeping and vacuuming, rototilling, harvesting, aeration, etc.

14 Claims, 10 Drawing Figures

PATENTED OCT 3 1972 3,695,716

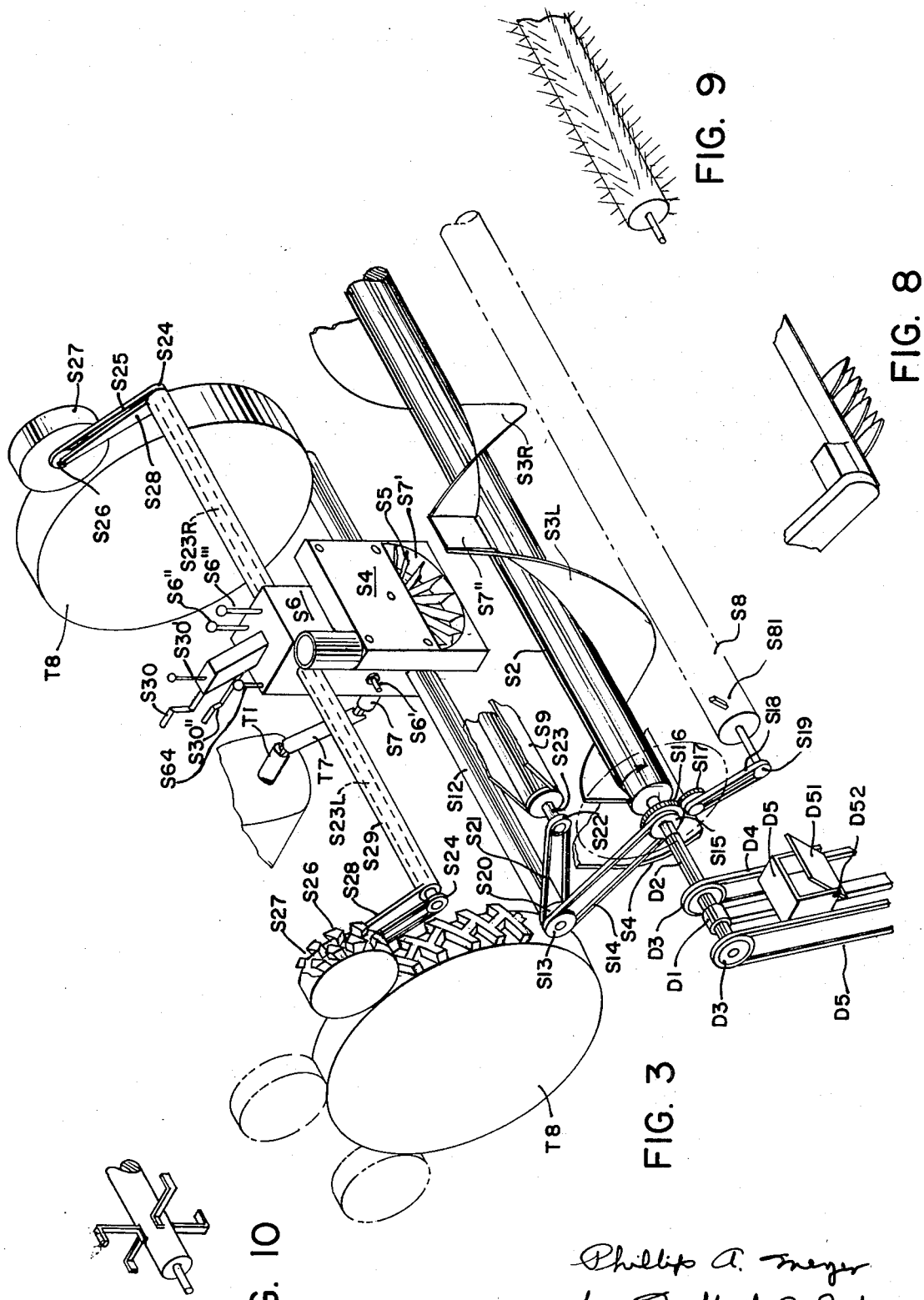

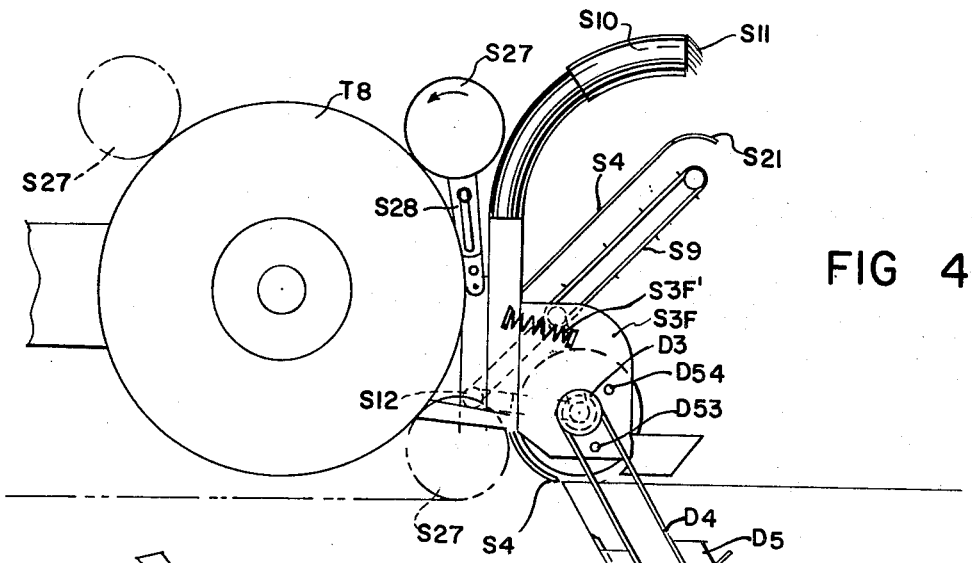
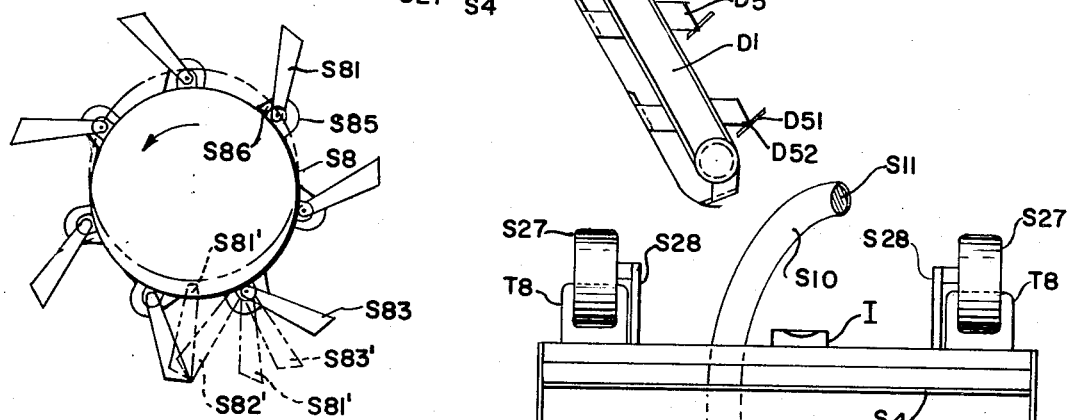
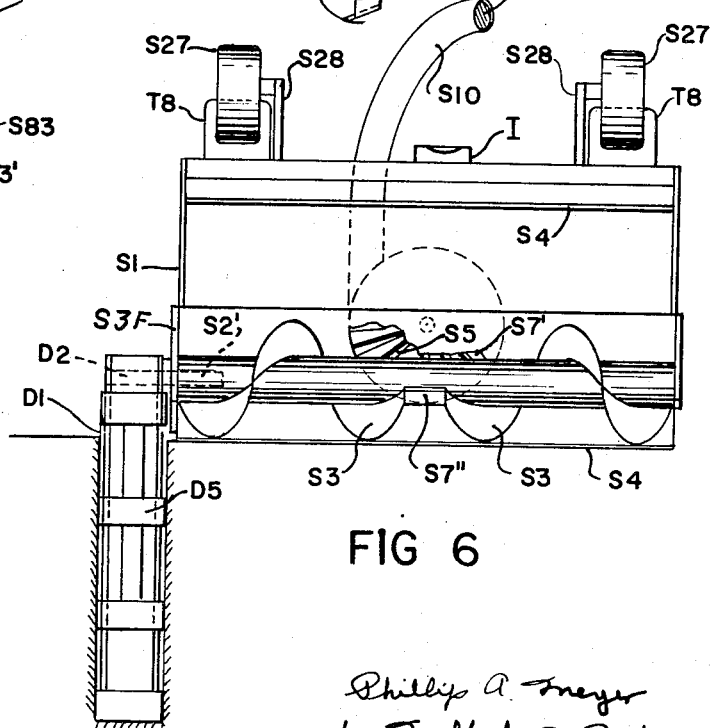

TRACTOR ATTACHMENT WITH VARIABLE SPEED DRIVE UNIT

Heretofore material processing equipment such as snow removal equipment has provided collectors for the snow and impellers for blowing the snow out of the roadway and a vehicle of some type has been used to move the machine along the roadway being cleared, but none of the prior art structures were effective because of lack of maneuverability and the difficulty in obtaining the optimum desired speed of the vehicle with respect to the speed of the snow collecting and disposal machine.

The present invention provides for attaching a material removal machine to a conventional tractor having the three link or similar support where two of the links are designed for vertical movement so that the machine carried by the three links can be conventionally raised and lowered. The present invention provides for power being taken from the power take-off to the material removal machine which material removal machine has ice breakers and horizontally acting screw means for collecting the material such as snow and moving the snow into an impeller which centrifugally throws the snow outwardly to a suitable conduit. The invention provides for an infinitely variable drive from the power take-off to driven wheels which engage the driving wheels of the tractor to move the tractor and the material removal machine at the most effective and varying rate for maximum efficiency.

An object of the invention is to provide a machine for attachment to a power take-off tractor which will serve to remove snow or other material and which is also adapted for connection of ditch digging and similar devices.

Another object is to provide an infinite speed control for the movement of the tractor with a power take-off for driving the tractor at extremely slow and infinitely variable speeds.

Other and further objects of the invention will be apparent as the description proceeds and upon reference to the accompanying drawings wherein:

FIG. 3 is a schematic perspective view showing the driving connection from the power take-off to the material collecting and projecting means and the slow and infinitely variable speed drive for the tractor;

FIG. 4 is a side elevation of the material removal machine with a ditch digger mounted thereon;

FIG. 5 is an end view of the ice breaker drum with the pivoted spring urged swingable arms and showing the cooperation therebetween;

FIG. 6 is a rear view of a modified machine with the ditch digger mounted thereon.

Figure 1:
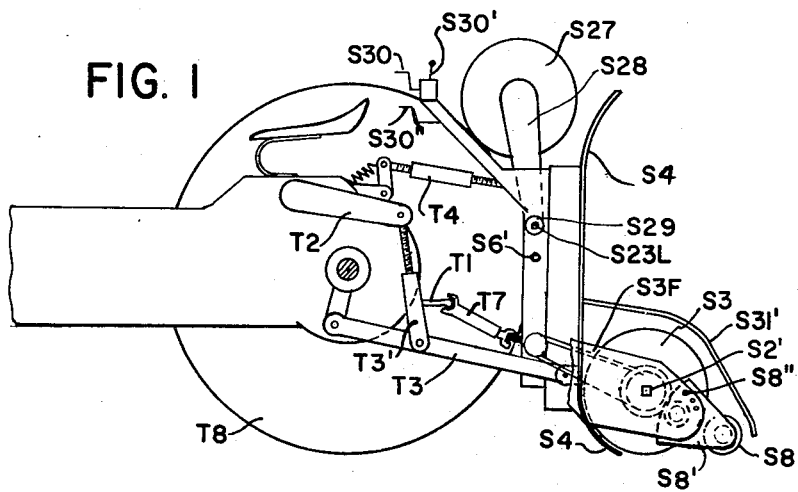
FIG. 1 is a side elevation of the snow removal machine mounted on a tractor with the supporting links and power take-off shown and taken substantially on line 1—1 of FIG. 2.

FIGS. 8, 9, and 10 show a mower, a raker and a rototiller attachment.

A conventional power take-off tractor T having a power take-off shaft T1 and vertically movable arms T2 is connected to material removal machine S by links T3R and T3L and a center adjustable link T4, suitable lugs being provided on the frame of the material removal machine for cooperation with the links.

To simplify the explanation, where parts are duplicated, the reference characters on the right will be designated with a postscript letter R and those on the left with a postscript letter L.

The material removal machine includes side frame members S1 connected by suitable horizontally extending frame members and provide a substantially rigid frame which is attached to the tractor by the links T3 for vertical movement. A material collector shaft S2 suitably mounted in the frame members S3F for rotation is provided with opposed screw blades S3 of opposite pitch for moving material such as snow towards the center. A cooperating apron S4 directs the snow into an impeller casing S4' in which a rotatable impeller S5 rotates at high speed being driven through the transmission S6 from the power take-off which drives the drive shaft S7 of the transmission by the connection shaft T7, the gearing being shown in the transmission providing for the driving of the various shafts. An auxilliary power take-off S6' is provided for spraying equipment or the like. Infinite speed control and reversing of shaft S12 and blower S5 is obtained by control levers S6'' and S6''' of Sundstrand units.

The impeller housing is provided with an opening S7' into which the snow is moved by the oppositely arranged screws S3 and a radially extending plate S7'' connecting the inner ends of the screw blades. An ice breaker drum S8 is rotatably mounted in the frame members S1 and engages the surface of the snow or other material to cause breaking of the snow or ice and also to move the snow toward the collector S2 and toward the center by the opposed screw sections of the shaft S2. A snow collector belt in one modification S9 is supported from extensions of side members S1 and serves to engage the snow at a substantial height to move it toward the collecting screw and into the impeller housing through the opening S7'. The snow collected by the belt S9 and the helical screws is projected out through the discharge duct S10 which is pivoted about a vertical axis to direct the snow in any desired direction. To prevent rocks or other dangerous pieces being projected a long distance a plurality of downwardly extending fingers S11 are provided adjacent the discharge opening and serve to deflect the large heavy pieces toward the ground while the small granular material may pass through.

FIG. 3 illustrates the drive from the tractor take-off shaft T1 through the shaft T7 having universal joints which drive transmission shaft S7 which is connected through suitable gearing to a counter shaft S12 which may have sprockets S13 at one or both ends which drive through chains S14 a sprocket S15 connected to the screw shaft S2 to drive the same in snow collecting direction. A spur gear S16 on shaft S2 drives a second spur gear S17 mounted on a stub shaft which stub shaft carries a sprocket which drives a chain S18 which drives a sprocket S19 on the shaft S8. The impeller S5 is driven by a shaft directly from the transmission S6 and suitable speed change gearing may be provided to obtain a desired speed of the impeller with respect to the speed of operation of the snow collector screws.

A sprocket S20 on shaft S12 drives a chain S21 which drives the sprocket S22 on the shaft S23' which drives the snow collecting belt S9. A snow directing shield S21 drives the snow into the cross bars of the belt S9. The transmission S6 also includes an infinitely variable speed control such as that sold by Sundstrand which drives shafts S23L and S23R through a suitable differential so that one shaft may be stopped while the other continues rotation. Sprockets S24 drive chains S25 which drive sprockets S26 positively connected to the wheels S27 which engage the tractor wheels T8. The wheels S27 are pivotally supported on telescopically adjustable frame arms S28 for pivotal movement about the axis of shaft S23 and this pivotal adjustment is accomplished by any suitable means such as by the crank S30 through suitable gearing which may include a worm gear mounted on the axle housing S29 which cooperates with a worm driven by the hand crank S30 for pivotal motion and S30'' for telescopic motion to move the wheels S27 into engagement with the tractor wheels T8. With the tractor driving gears in neutral, the tractor may be moved by the power supplied by wheels S27 against the tractor wheels T8 and the speed of operation of the shaft S23L and S23R is controlled by a lever S30' which controls the Sundstrand infinitely variable and reversing drive so that the tractor can be moved forwardly or rearwardly by the driving action of the wheels S27 against the tractor wheels and the speed can be controlled forward or stopped and reversed. The wheels S27 and T8 preferably have lugs on the tires for positive gear-like driving action with the lugs on the tractor tires.

FIG. 5 shows one form of the ice breaker S8 in which arms S81 are pivotally mounted in the drum S8 in any suitable manner such as projecting lugs or inwardly extending recesses and such arms are preferably arranged in helical formation to produce a progressive chipping action, each arm being urged by a strong spring S85 against its stop S86 to full-line position S81. The dotted lines showing intermediate positions of the arms S81' and S82' show how the chipping action is obtained.

When the screw S2 or the ice breaker S8 engage a solid abutment, the entire snow removal machine S of FIG. 1 is raised up by the projection, thereby also raising the wheels S27 out of driving engagement with the tractor wheels and the tractor stops thereby avoiding danger of damage to the screw S2 or the ice breaker S8.

In the modification of FIG. 4 the frame members S3F are pivotally mounted for movement about shaft S12 and urged to operative position against a stop by compression spring S3F'.

The ditch digging attachment is shown in FIGS. 4 and 6 and such ditch digging attachment includes a frame D1 on which a pair of sprockets are mounted on a shaft D2 which has a square extension which is received into a correspondingly shaped rectangular bore S2'. The shaft D2 is rotatably mounted in bearings at the upper end of frame D1 and carries sprockets D3 driving chains D4 carrying buckets D5 which produce the digging action. The front wall D51 is pivotally mounted at D52 adjacent the upper edge of the bucket in digging position and the front side D51 is held in closed position by the earth engaging the same, while the upper extension of the front D51 cuts into the earth. A pin D53 passes through the frame D1 and passes into the frame S1 or S3F to maintain the digger in the operative position. The pin D53 is also adapted to retain the ditch digging attachment in a raised position by engagement of the slidable pin with a corresponding opening D54 in the frame member S1 or S3F.

Figure 7:
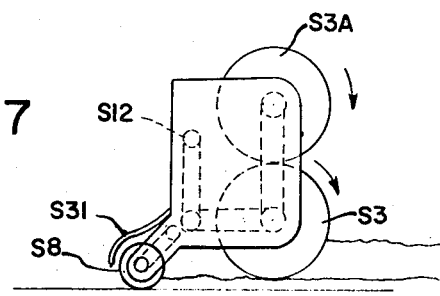
FIG. 7 is a side elevation of a modification having two screws and with the ice breaker on the opposite side. Also having shrouds to enhance the vacuuming effect of the impeller in removing even very fine particulate matter from the surface being traversed.

In the modification of FIG. 7, in addition to the helical screw S3 an upper helical screw S3A is rotatably mounted in suitable bearings and driven from the shaft S12 through suitable chains and sprockets as illustrated in dotted lines. In this modification the ice breaker S8 is driven in the manner shown in FIG. 3 with the spur gears S16 and S17 cooperating to drive the chain S18 so that the direction of rotation of the ice breaker S8 is opposite that of the screw S3. The ice breaker S8 in FIG. 7 tends to throw the chips against the screw S3 so that the screw S3 may carry the pulverized ice into the impeller S5 through the opening S7' in the impeller casing S4.

A detachable shroud S31 (FIG. 7) or S31' (FIG. 1) acts to limit airflow from around the implement entering the impeller S5 and causes the limited airflow to act as a vacuum cleaner by entraining the lighter particles in the airflow and transporting the lighter particles to the impeller where the particles are disposed of with the rest of the material.

The position of the links T3, T3 and T4 can be adjusted by the screw connections T3' of the links T3 to the arms T2 and the length of link T4 can be varied by the screw adjustment.

The invention therefore provides equipment for acting on material to move the material to a desired location, such as removing snow from a roadway onto the bank of the road and the infinite speed drive of the wheels S27 provides for very slow speed of movement of the tractor and of the material treating machine of the present invention and if an obstruction is encountered, the obstruction would raise the attachment thereby disengaging the wheels S27 from the tractor wheels T8 but the screw will continue in its operation as well as the impeller and the ice breaker to further pulverize the material being worked upon or merely to clear out the collected material.

The operator has complete control of the equipment by controlling the speed of the take-off to the most economical speed for the feed screws and the impeller and the speed of movement of the tractor and the attachment can be made to be a very slow creep or a relatively fast movement by the infinite control lever S30'.

An inclinometer I such as a spirit level I is supported on the attachment to inform the operator at what inclination the implement is being operated or a ditch is being dug.

Figure 2:
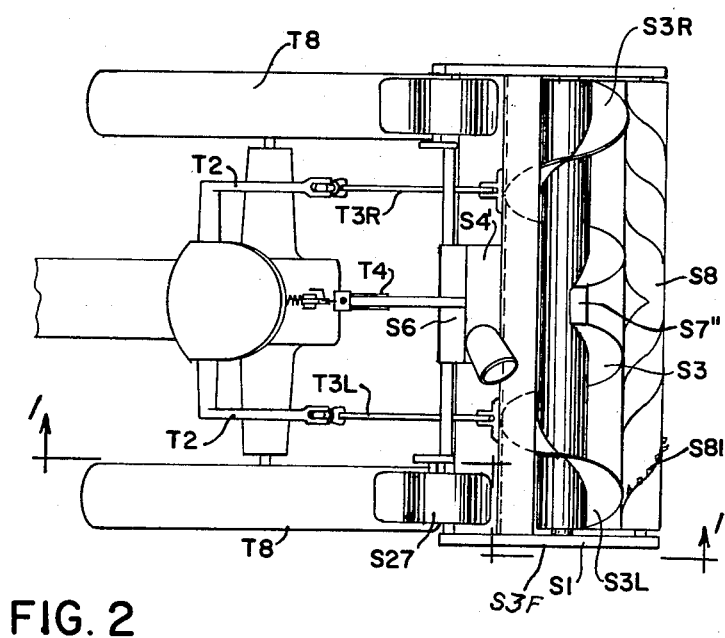
FIG. 2 is a plan view of FIG. 1.

Drum S8 mounted on a frame S8' is held in position by a pin S8'' passing through aligned apertures in the side frame members S3F to maintain the desired relation between the periphery of the tips of the ice breaker blade S81 and the ground surface on which the attachment is operated. As shown in FIG. 5, the counterclockwise rotation is against the rearward movement of the tractor and the attachment and when the tips of the blades S81 by chance engage the surface of a solid abutment the blade S81 moves to the position S81' and S82' raising drum S81 and thereby the frame members S3F against the force of the spring S3F' which normally urges the frame members S3F with the screw collectors S3 into contact with the ice. The spring S3F prevents damaging forces while maintaining the ice breaker and the screw material collector in proper operative position. Where hard ice is engaged the dotted line position of S83' would cause the ice to chip without causing the shaft S8 to be raised so that the frame members S3F would not necessarily be pivoted in many cases. The springs S85 urge the particles of ice upwardly and forwardly and the blades are preferably arranged in a helical pattern as shown in FIG. 2 to urge the particles toward the center in a manner similar to the collector S2 with the helical blades S3.

The driving wheels S27 are shown in full line in the first quadrant so that any raising of the attachment causes the wheels S27 to move upwardly away from the tractor wheel T8 thereby disengaging the wheel drive while the material collecting mechanism continues to operate to reduce the load and driving again continues when conditions are appropriate.

The wheel S27 can be moved to the dot dash line position to engage the ground and actually raise the tractor wheels up out of contact with the ground. These two positions of the wheels S27 can be accomplished because of the telescoping adjustment S28 of any conventional type such as a pair of channels with cooperating slots held together by suitable bolts. The supports S28 may be lengthened further so as to engage the wheel T8 at the upper left portion of the wheel and in this situation it will be apparent that the driving action is increased by the force of rotation of the wheel S27 in addition to the weight of the attachment while in the full line position the driving action of the wheels S27 tends to remove some of the weight acting downwardly by the mass of the attachment.

The length and position of the attachment wheels support arms S28 will determine the work characteristics of the attachment wheel drive.

Long support arms will position the attachment wheels forward of the tractor wheel axis upon engagement and upon the encountering of resistance by the implement will inherently urge the implement downward against the work. Short support arms as shown in full lines in FIGS. 1 and 4 will cause the implement to lift up away from the work and also disengage the attachment wheels from the tractor wheels upon encountering resistance by the implement. Varying the length of the support arms between these two extremes will result in a particular reaction characteristic of the implement and its drive. The length of the support arms is tailored to produce the desired reaction characteristic necessary for a particular job, such as long arms for ice chipping, shorter arms for pavement sweeping or lawn cleaning.

The drive produces infinite speed variation and a reversible drive with the ribs of the tractor tires T8 and the ribs of the tires S27 producing the necessary gearing action so the tractor can be operated to pivot around one of its wheels by steering the tractor and by differential braking of the conventional tractor brakes. The automatic disengagement of the drive explained above and the forced engagement or resistance of the attachment on the ice is believed to be explained above.

The invention is suitable to load silage or other piled material by driving the tractor in reverse direction with the collector screw S2 moving the material toward the opening in the impeller housing and the speed of the impeller can be accurately controlled by the infinitely variable speed control lever S6''' so that all types of material can be handled and the speed of rotation of the collector can be controlled by the handle S6'' to produce the optimum characteristics for moving the material such as silage or the like. It will be apparent that in certain circumstances the frame S3F may be fixed to produce the proper positive force for producing a digging action such as digging ditches and the like. The adjustment of the three point support makes it possible to produce the desired optimum cutting or digging level and the optimum speed of movement of the tractor with relation to the speed of the impeller S5 and collector screw S2 provide for optimum operating conditions.

The impeller S5 may be readily changed to take a chopper type impeller for chopping silage and the like and can also serve as the elevator for raising the silage into a silo. Liquid may be injected into the chute of the duct S10 of the blower to obtain the proper moisture or chemical characteristics in the product being operated upon. The rock diverter shield S11 causes the stones or other hard objects to be projected downwardly while the smaller and lighter particles may be blown out directly between the spaced bars thereby avoiding danger of injury to persons in the vicinity. The exhaust of the tractor is used with a muff heater around the chute S10 to prevent refreezing of the snow in the chute under critical conditions.

The interchangeability of the impeller makes it possible to use blades for high air entrainment, for silage or forage chopping, for material moving, and for low chopping speeds using rubber plastic blades for material, such as unshelled corn.

Large solid material is accommodated automatically on the helical collector S3 and a suitable grid may be provided on the lower inlet S7' to prevent overloading the impeller and the size of such opening may be controlled by a suitable gate to obtain the desired air entrainment with respect to the material being moved or the forage being chopped or the grain being loaded. The relative speeds can be accurately controlled.

The machine is particularly suitable for wide ditch digging and field leveling for irrigation preparation using the ice chipper S8 for shallow digging, or the making of field drainage ditches by the ditching attachment D. The attachments of FIGS. 8, 9 and 10 are adapted for substitution for the ice braker S8 or collector S3 so that mowing may be carried on with the first attachment, raking, or aerating with the second attachment and rototilling with the third attachment.

It will also be apparent that the invention is adapted to make use of brushes to clean by sweeing and vacuuming action and spiked tines such as shown in FIG. 9 may be increased in length to extend into the earth to produce aeration. A seeding attachment is adapted to be operated by the auxilliary power take-off S6' and the speed thereof may be controlled by an infinitely variable speed control lever S64 which controls a Sundstrand unit of infinitely variable speed and reversing characteristics.

The invention also is adaptable to do several other jobs separately or simultaneously, such as pavement, lawn, or field sweeping and vacuum cleaning; lawn-field stubble-leaf raking and cleaning; rototilling leveling and reseeding; power raking and debris removal for lawn rejuvenation; soil puncturing for soil aeration and fertilizer injection; silage-forage cutting-harvesting-processing, by replacing the gathering screw with the proper rotary broom or steel rotary tines and appropriately selecting the correct direction and revolutions per minute for the rotary tool S8 and the impeller, to do the job with the most efficient use of time and horsepower available for the tractor, yet allowing a variable speed of traverse into or along the material being processed to accommodate changes in the texture and quantity of the material.

It will be apparent that changes may be made within the spirit of the invention as defined by the valid scope of the claims.

What is claimed is:

1. An attachment for mounting on a wheeled tractor, said tractor having a power take-off and being equipped with a three-point or like hitch, said attachment comprising a frame, means on the frame for mounting said frame on the three-point or like hitch of the tractor whereby the frame may be raised and lowered as desired, means on the frame for direct engagement with material to be worked, a pair of drive wheel supports mounted on the frame at opposite sides of the frame, drive wheels mounted on said drive wheel supports adapted to engage the tractor wheels, a drive connection between said power take-off and said drive wheels on the supports including means for large numbers of adjustments of the speed of the drive wheels on the supports whereby the drive wheels may be engaged with the tractor wheels to accomplish a driving action and produce speed variations in the movement of the tractor and the attachment, whereby maximum efficiency of the material engaging means may be obtained while allowing the tractor engine to continuously operate at its optimum power output speed.

2. The invention according to claim 1 in which the attachment includes a collector device for feeding the desired material toward the center of the attachment and a selective variable speed interchangeable impeller is mounted on the frame for receiving and processing the collected material and discharging the collected material at a selected location.

3. The invention according to claim 2 in which a material digging and chipping shaft is rotatably mounted in the frame and includes a plurality of arms to engage the material and direct it toward the center of the attachment.

4. The invention according to claim 2 in which the collector device is mounted on frame members resiliently movable with respect to the frame of the attachment to prevent serious damage to the machine from large solid objects.

5. The invention according to claim 1 in which the power take-off drives a horizontally extending shaft, and a ditch digging attachment having a drive shaft thereon is connected to the horizontal shaft for driving engagement, said ditch digging attachment including a frame member and endless belts are mounted for movement by the shaft and carry earth carrying buckets.

6. The invention according to claim 5 in which the buckets are provided with pivoted fronts to assist in discharging the contents of the buckets.

7. The invention according to claim 1 in which screw means are operated by the power take-off to move the engaged material towards the center and an impeller is mounted in a casing to project the material at a desired location, the mounts for the drive wheel supports including pivoted and telescoping arms and means to move the arms toward and away from the wheels of the tractor, a belt extending between the side frame members and extending upwardly and outwardly and means to operate the belt to urge material into the impeller for discharge therefrom.

8. The invention according to claim 1 in which the position of the attachment can be adjusted for various contours over which the tractor and the attachment pass.

9. The invention according to claim 1 in which a collecting screw is rotatably mounted on the frame and is provided with sharp edges and an apron surrounds at least a portion of the collecting screw to provide a cutting action.

10. The invention according to claim 9 in which a centrifugal impeller is mounted on the frame and driven from the power take-off to receive the cut material and a duct is provided to move the cut material onto a surface.

11. The invention according to claim 1 in which a rototiller shaft is rotatably mounted on the frame and is provided with slashing blades to work the earth.

12. The invention according to claim 1 in which the means for direct engagement with the material is a shaft having relatively long spikes and is rotatably mounted in the frame and is driven from the power take-off at the optimum speed to produce aeration of the soil.

13. The invention according to claim 1 in which the drive wheels of the attachment may be adjusted to engage the ground surface on which the tractor is operating to provide traction and control propulsion force.

14. The invention according to claim 1 in which the attachment is provided with inclinometers visible to the operator so the pitch and cant of the attachment may be readily and accurately controlled thereby providing for accurate depth or grade control to the digging action of the attachment.

* * * * *